UNITED STATES PATENT OFFICE.

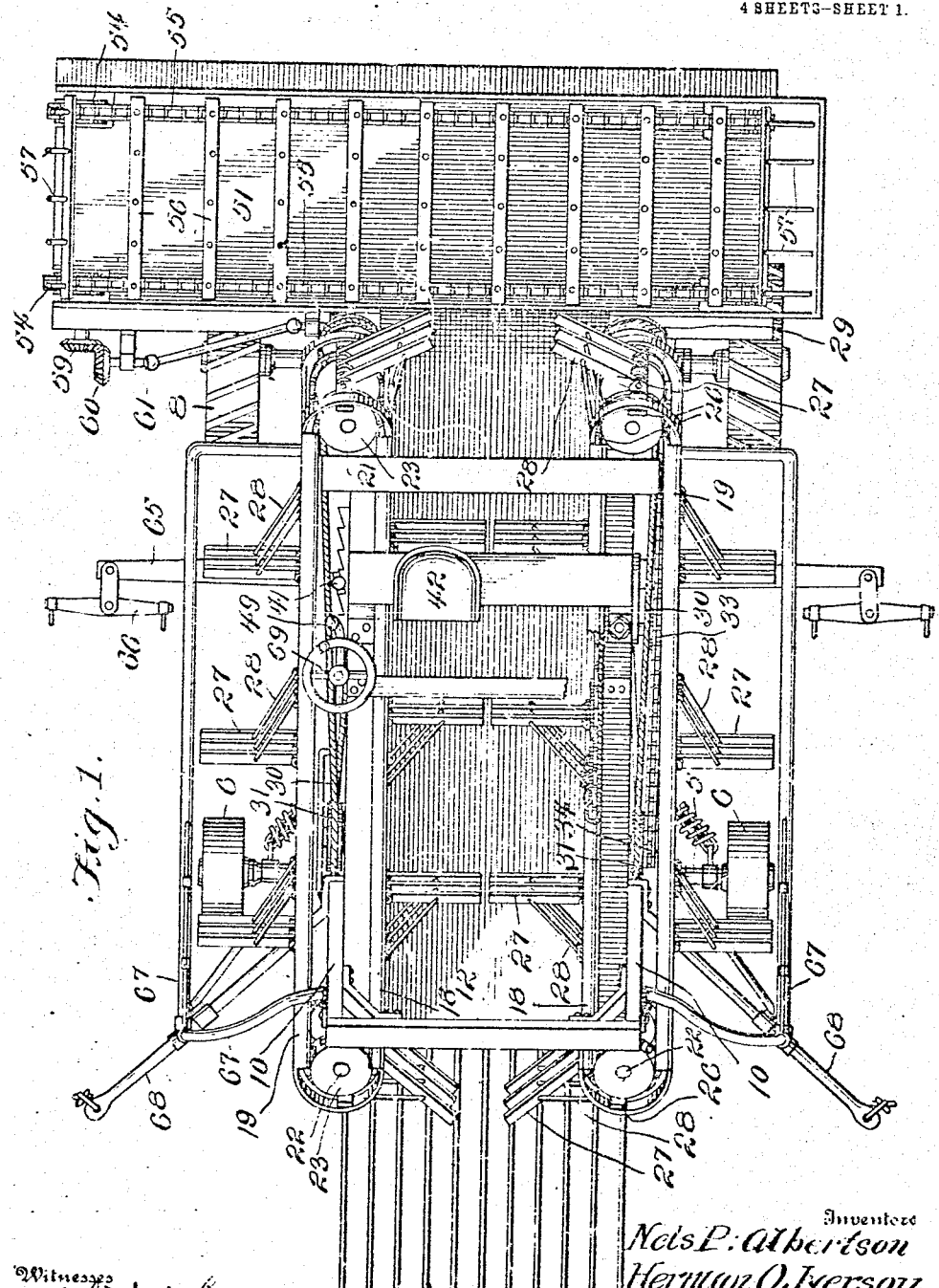

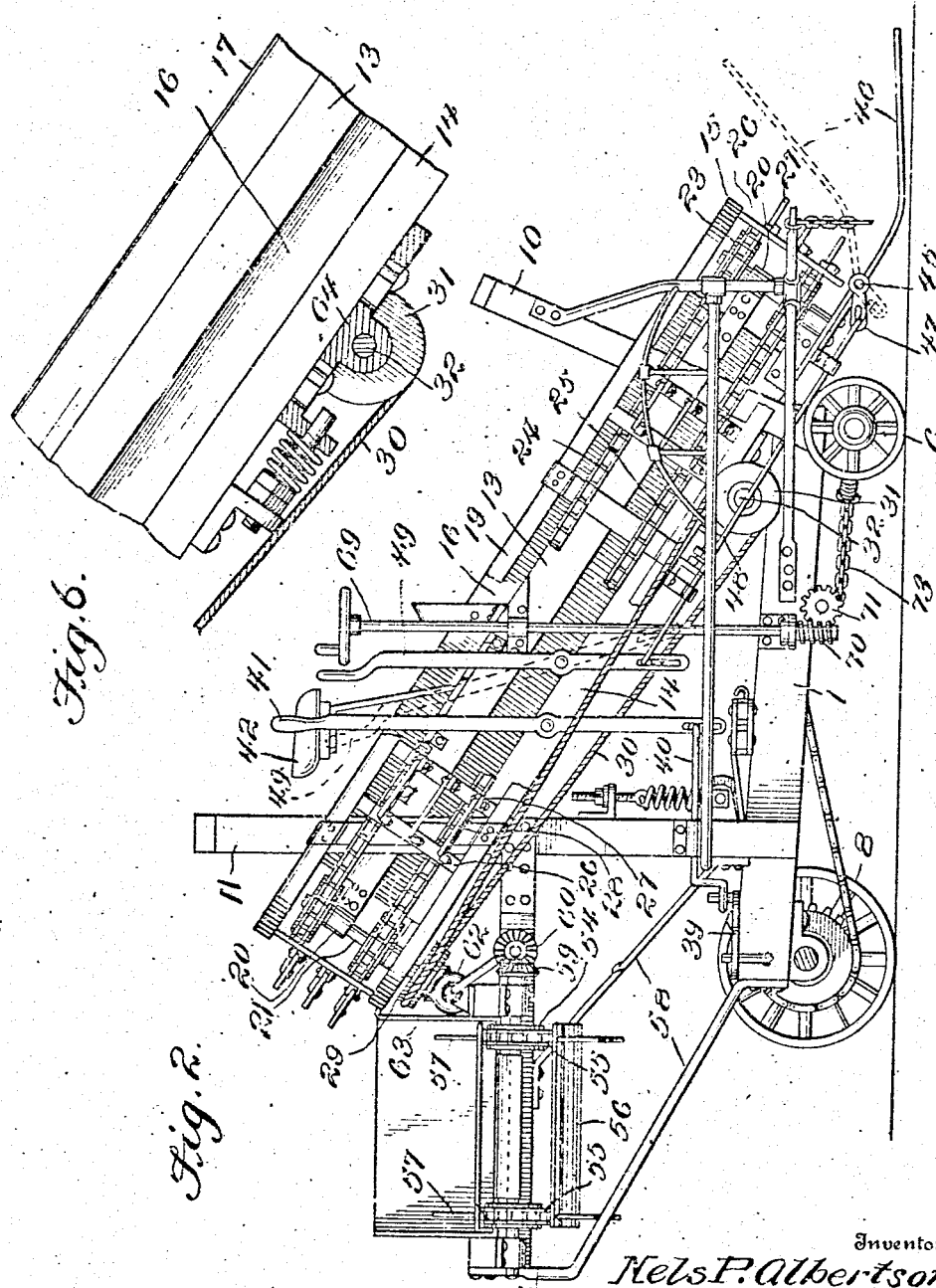

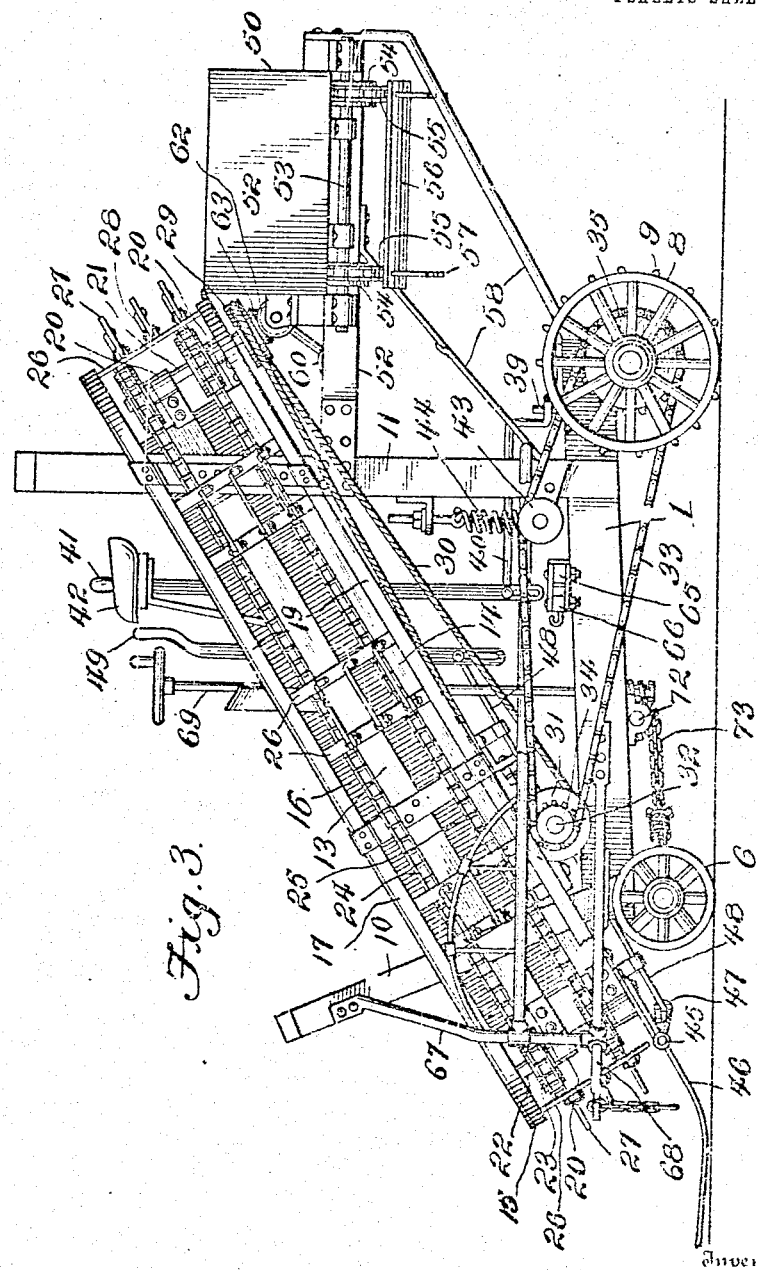

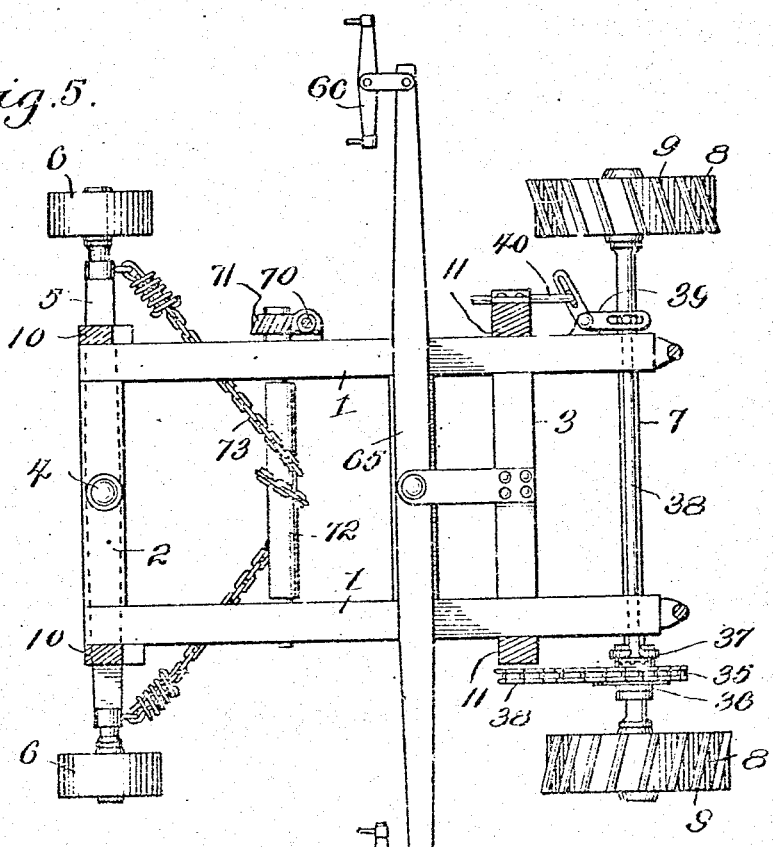
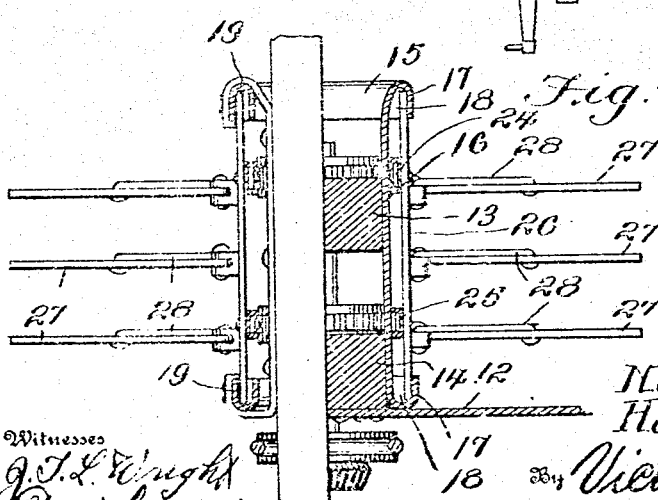

NELS P. ALBERTSON AND HERMAN O. IVERSON, OF OAKES, NORTH DAKOTA.

SHOCK-LOADER.

1,009,821.   Specification of Letters Patent.   Patented Nov. 28, 1911.

Application filed June 4, 1909. Serial No. 500,131.

*To all whom it may concern:*

Be it known that we, NELS P. ALBERTSON and HERMAN O. IVERSON, citizens of Denmark and the United States, residing at Oakes, in the county of Dickey and State of North Dakota, have invented new and useful Improvements in Shock-Loaders, of which the following is a specification.

The invention relates to an improvement in shock loaders, being particularly directed to a construction in the operation of which the shock is picked up, forced lengthwise the machine and simultaneously elevated and delivered to a laterally operating carrier from which it is discharged into the grain wagon or other vehicle.

The main object of the present invention is the provision of a shock loader in which automatically operating elevators receive the shock from the pick-up and force the same longitudinally of the machine to a relatively elevated position.

A further object of the invention is the provision of means whereby the travel of the elevator and the degree of contact between the pick-up and the ground may be manually controlled by the operator from his seat on the machine.

A still further object of the invention is the provision of a carrier operating at right angles to the upper end of the elevating mechanism and discharging at a position to one side of the elevator, so that the shocks carried up in the elevator and delivered to the carrier may be discharged by the latter into a suitable vehicle traveling with the loader.

The invention will be described in the following specification, reference being had particularly to the accompanying drawings, in which:—

Figure 1 is a plan of the improved loader. Fig. 2 is a side elevation of the same, viewed from the discharge end of the carrier. Fig. 3 is a similar view taken from the opposite side. Fig. 4 is a sectional view through one side of the elevator structure. Fig. 5 is a plan, showing the steering mechanism. Fig. 6 is a broken elevation, showing a portion of the elevator and illustrating particularly the means for maintaining a proper tension of the drive belt.

Referring particularly to the accompanying drawings, wherein is shown the preferred form of details of structure, my improved shock loader comprises a main frame including side bars 1 and cross bars 2 and 3, the cross bar 2 being arranged at the forward ends of the side bars and serving as a support for the king bolt 4 on which is secured in the usual or preferred manner the forward axle 5 carrying ground wheels 6. The side bars 1 extend in rear of the rear cross bar 3 and support in suitable bearings carried thereby near their rear ends the rear axle 7. On the ends of the axle 7 are mounted ground wheels 8, the peripheral surfaces of the treads of which are preferably ribbed at 9, as the rear ground wheels serve as drive wheels for the movable parts of the apparatus. Rising from the forward ends of the side bars are uprights 10, preferably forwardly inclined with relation to the plane of said bars, and secured to and rising from the side bars near their rear ends are uprights 11 which extend at a right angle to the plane of the side bars. Secured between and to the respective sets of uprights is a platform 12 constituting the main platform over which the shocks are directed in the feeding operation. Secured to the inner surfaces of the respective longitudinally alined uprights are upper and lower stringers 13 and 14, the latter being approximately on a plane with the platform 12 and the former some distance above the platform. The stringers form means for supporting guide plates 15 which are duplicated at the respective side edges of the main platform, said side plates extending approximately throughout the length of the platform and comprising metallic sections 16 secured to the respective stringers and extending above the upper stringer and having their upper and lower edges bent inwardly, as at 17, to form guide channels 18 on the inner side of and at the upper and lower edges of the guide plates. That portion of the plates which includes the channels 18 is extended beyond the respective ends of the plates and carried around and outwardly from the guide plates and extended in parallel relation to said guide plates outwardly beyond the uprights 10 and 11, forming guide channels 19, which are in effect a continuation of the guide channels 18 being either formed integrally with the guide plates or separately therefrom and secured in any appropriate manner thereto to provide the continuous guide channels. In bearings 20 secured to the respective ends of the stringers are mounted upper and lower stub shafts 21 and 22, on each of which shafts immediately above the adjacent stringer is mounted a sprocket wheel 23. By this construction there is provided at each side of the platform and above the same guide plates forming continuous guide channels; there being arranged at each end of each guide plate and within the plane of the rounded portion of the guide channel upper and lower sprocket wheels.

The horizontally alined gears of each guide plate are connected by sprocket chains 24—25, the former engaging the upper sprocket wheels of each guide plate and the latter the lower sprocket wheels. Secured to the chains at appropriate intervals are cross bars 26, which are in effect comparatively narrow strips of non-resilient metal of such length that upper and lower ends will be disposed and remain at all times in the guide channels 18 and 19 during the travel of the chains. To certain of said strips 26 are secured carrier fingers 27, each of which is braced by a strip 28 secured to the finger intermediate its ends and fixed at its inner end to a strip corresponding in all respects to the strip 26. The fingers are preferably pivotally connected to the strips 26 so as to allow said fingers to accommodate themselves to the movement of the chain, the normal position of the fingers in traveling lengthwise the platform being at direct right angles to the guide plates 16. The fingers are so arranged that those on one side of the platform will aline transverse the platform with those on the other side during operation, and are of such length as to just permit their inner ends to clear each other, thereby avoiding the possibility of allowing any material to pass through the fingers in their movement up the platform.

The respective chain shafts 21 are driven from the rear axle in the following manner. The upper shafts 21 of each pair are extended below the stringers 14 and each is provided with a belt wheel 29 which is engaged and driven by a belt 30 passing over a second belt wheel 31, the respective ends of a shaft 31 being secured on opposing ends of a shaft 32 mounted in bearings secured to the lower side of the platform adjacent the lower end of the latter. The shaft 32 is driven through the medium of a sprocket chain 33 engaging sprocket wheels 34 fixed on the shaft 32 and a sprocket 35 fixed on the rear axle, as clearly shown in Fig. 3 of the drawings. The sprocket 35 is preferably carried on one member 36 of a clutch, the opposing member 37 of which is keyed to the axle and controlled through a rod 38 leading through intermediate lever connections 39 and rod 40 to a hand lever 41 extending adjacent the seat 42 of the operator, so that the travel of the fingers lengthwise the platform can be readily controlled at the will of the operator. If desired the sprocket chain 33 may be passed over an automatic belt tightener including an idler 43 suspended in a bearing controlled by a spring 44 whereby to take up any slack in the chain.

Secured upon a shaft 45 supported in bearings at the lower and forward end of the platform 12 are pick up fingers 46, preferably rod like sections curved intermediate their ends so as to present the forward or free ends upon a plane slightly above the surface over which the machine is traveling, the curvature providing for contact of the fingers with said surface at the point in rear of the forward ends, as clearly shown in Fig. 3. An arm 47 is secured to one end of the shaft 45 and connected through the medium of a rod 48 with a hand lever 49 also extending adjacent the seat 42, the operation of the lever providing for adjustment of the pick-up fingers at the will of the driver.

Arranged transverse and slightly below the rear or upper end of the platform 12 is a carrier 50 including a platform 51 supported on bars 52 extending rearwardly from the uprights 11. The platform 51 extends transverse or across the platform 12, the inner end of said carrier platform terminating slightly beyond the adjacent side of the main platform while the outer or discharge end of the carrier platform is disposed some distance beyond the opposing side of the main platform, that is the discharge end of the carrier platform is of such distance beyond the adjacent side of the machine as to discharge any material from the carrier platform to one side of and wholly beyond the operating parts of the machine.

The carrier platform is protected by an edge wall 52' open only at the forward or discharge end, said wall being of a height to dispose the upper edge thereof in alinement with the rear or discharge end of the main platform, as will be clear from Fig. 2.

Mounted in bearings secured beneath the carrier platform adjacent the respective ends thereof are shafts 53 on each of which near their ends are mounted sprocket wheels 54, as shown. The longitudinally alined pairs of sprocket wheels are designed to carry sprocket chains 55 connected by flights 56, the disposition of the parts being such that the flights are adapted to travel over and in practical contact with the upper surface of the carrier platform. The flights may if desired be provided with upwardly projecting fingers 57 whereby to more effectively carry the material carried by the main platform lengthwise the carrier platform. The carrier platform is further supported by braces 58 secured to the main structure and one of the shafts 53 is extended toward the main platform and provided with a bevel gear 59 designed to mesh with a bevel gear 60 carried on one end of a flexible shaft 61, the opposite end of which is driven through a bevel gear 62 meshing with a bevel gear 63 on the lower end of one of the shafts 22, as clearly shown in Figs. 1 and 2. By this means it will be noted that as long as the elevating fingers are traveling over the main platform the carrier flights will be traveling over the carrier platform and that any material delivered from the main platform will be deposited in the main carriage and forced lengthwise the same to a point of discharge. Preferably I utilize a vehicle, as a wagon, designed to travel along with the shock loader and to receive the material delivered from the carrier, as is usual in this type of apparatus. The shaft 32 is preferably mounted in spring pressed adjustable bearings 64, whereby to permit a yielding of the belt 30 in the event an impassable obstruction is met so that danger of breakage of the parts through such obstruction is avoided. The apparatus is designed for propulsion by animal power and the latter are connected to the side of the machine. A transversely arranged draft bar 65 is pivotally secured on the main frame and carries swingletrees 66 at the ends beyond the apparatus. Brace rods 67 are also secured to the side structure of the frame and support auxiliary draft rods 68 by which additional animals may be hitched to the machine if necessary.

The machine is steered through the medium of a steering rod 69 mounted adjacent the driver's seat and carrying on its lower end a worm 70 designed to drive a worm gear 71 secured upon one end of a shaft 72 mounted in the side bars 1 of the main frame, about which shaft is secured a steering chain 73 terminally fixed to the axle 2 beyond the side bars, the chain being coiled several times about the shaft 73 so that movement of the latter under the influence of the steering rod will turn the axle in the desired direction.

The operation of the machine will be readily understood from the above description taken in connection with the drawings, it being obvious that by means of the pick-up fingers the shocks are directed onto the main platform, taken up by the elevator fingers 27, forced lengthwise the platform and delivered to the carrier platform from which they are forced laterally into any suitable receiver.

Having thus described the invention what is claimed as new, is:—

In a device of the class described, the combination of a supporting frame, uprights carried by said frame, a platform mounted on said uprights and inclined relative to the supporting frame, stringers carried by said uprights above said platform and parallel thereto, a guide plate secured to said stringers and extending throughout the length of the platform, said plate extending above the stringers and having its upper and lower edges bent inwardly to form guide channels, said channels being extended beyond the respective ends of the plates and carried around and outwardly therefrom beyond the said uprights to form second guide channels, said second channels being in effect a continuation of the first-named channels whereby to form an endless guide channel, elevating devices comprising chains mounted intermediate said guide channels, cross bars carried by said chains and operating in said guide channels, and a plurality of article engaging elements carried by said cross bars.

In testimony whereof we affix our signatures in presence of two witnesses.

NELS P. ALBERTSON.
HERMAN O. IVERSON.

Witnesses.
OSCAR KALLESTAD,
P. J. ANDERSSON.